United States Patent Office 2,964,497
Patented Dec. 13, 1960

2,964,497

STABILIZED POLY-α-OLEFIN COMPOSITIONS

Charles J. Kibler and Gordon C. Newland, Kingsport, Tenn., assignors to Eastman Kodak Company, Rochester, N.Y., a corporation of New Jersey No Drawing. Filed Mar. 24, 1958, Ser. No. 723,118

12 Claims. (Cl. 260—45.85)

This invention relates to the stabilization of poly-α-olefin compositions. A preferred embodiment of the invention relates to the stabilization of polyethylene compositions against deterioration resulting from exposure to sunlight or ultraviolet light.

Poly-α-olefins such as polyethylene, polypropylene and the like are subject to photo-oxidation when exposed to sunlight. This oxidation in poly-α-olefins is characterized in its earlier stages by the breaking of the polymer chain and the formation of carbonyl groups in the molecule with a resultant deleterious effect on the electrical properties of the polymer. As the oxidation continues, the poly-α-olefin cracks and loses tensile strength to the point of mechanical failure. A number of so-called ultraviolet inhibitors are known which inhibit the photo-degradation of many polymers, resins and polyesters. However, some of the most effective of these known ultraviolet inhibitors, such as 2,4-dihydroxy benzophenone, are not compatible with such poly-α-olefins as polyethylene due to exudation from the polyethylene soon after being incorporated therein. Also, there are other common ultraviolet inhibitors that are compatible with polyethylene but are not entirely satisfactory stabilizers for polyethylene, typical of such stabilizers being phenyl salicylate. In addition, many effective stabilizers for halogen-containing polymers such as polyvinyl chloride, polyvinylidene chloride, poly(2,3-dichloro-1,3-butadene) and the like are not necessarily effective stabilizers for poly-α-olefins, as stabilizers in halogen-containing polymers function essentially as halide scavengers while stabilizers in poly-α-olefins do not serve this function. Similarly, certain stabilizers that are imminently suitable as ultraviolet inhibitors in such cellulosic esters as cellulose triacetate, cellulose acetate butyrate and the like are not particularly effective in poly-α-olefins. Hence, it is highly unpredictable as to whether a given stabilizer or ultraviolet inhibitor will be both compatible with, and a good stabilizer for, poly-α-olefin compositions short of actually testing the material in poly-α-olefins.

It is an object of this invention to provide new poly-α-olefin compositions of high stability.

It is a further object of this invention to provide novel polyethylene compositions containing additives that are compatible with, and effective stabilizers for, the polyethylene compositions.

It is likewise an object of this invention to provide new polyethylene compositions having improved stability against deterioration resulting from exposure to sunlight or ultraviolet light.

It is also an object of this invention to provide new polypropylene compositions having improved stability against deterioration resulting from exposure to sunlight or ultraviolet light.

Other objects of the invention will be apparent from the description and claims which follow.

The present invention comprises poly-α-olefin compositions having incorporated therein a stabilizing amount of one of the following β-resorcylic acid derivatives:

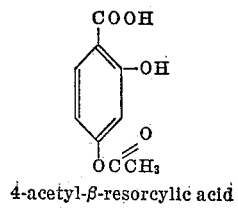

4-acetyl-β-resorcylic acid

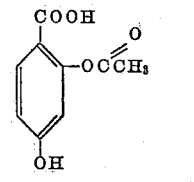

2-acetyl-β-resorcylic acid

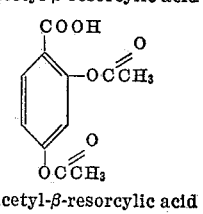

diacetyl-β-resorcylic acid

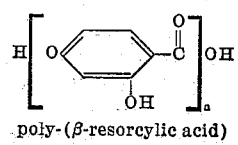

poly-(β-resorcylic acid)

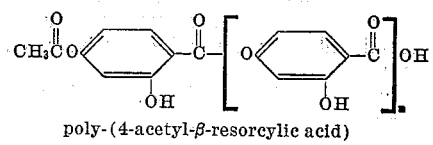

poly-(4-acetyl-β-resorcylic acid)

The β-resorcylic acid derivatives described herein can be used to stabilize a wide variety of poly-α-olefin compositions against deterioration resulting from exposure to ultraviolet light. Any of the common normally solid poly-α-olefins prepared from the normally gaseous α-monoolefinic aliphatic hydrocarbons containing 2 to 10 carbons atoms can be stabilized in accordance with the invention. The present β-resorcylic acid derivatives are preferably used in polyethylene although such poly-α-olefins as polypropylene, poly-4-methylpentene-1, poly-3-methylbutene-1, and the like are included in the present invention. Both the so-called, "low density" and "high density" poly-α-olefin compositions can be stabilized in accordance with the invention. With regard to polyethylene, for example, "low density" polyethylene usually has a density of about 0.91 to 0.93 and can be prepared by several methods including the method disclosed by Fawcett et al. in U.S. Patent No. 2,153,553. "High density" polyethylene usually has a density of about 0.94 to 0.97. High density poly-α-olefins can be prepared by such methods as are disclosed in co-pending applications, Coover U.S. Serial No. 559,536 which was filed January 17, 1956 and Coover U.S. Serial No. 613,609 which was filed October 3, 1956. While the subject stabilizers are more usually used to stabilize the more common solid plastic poly-α-olefin compositions having average molecular weights in excess of about 15,000 and usually in excess of about 20,000, these stabilizers likewise can be used to stabilize the so-called poly-α-olefin waxes having lower molecular weights.

The amount of the present stabilizer employed in poly-α-olefin compositions can be widely varied, the stabilizing amount used varying with the particular poly-α-olefin composition and the use to which the poly-α-olefin composition is to be put. Concentrations of the stabilizer of at least 0.1% are suitably used, with concentrations of 0.1% to 10% being more generally used, with concentrations of 0.5% to 5% and often times 0.5% to 2.5% being preferably used, the concentrations of the stabilizer being based on the weight of the poly-α-olefin.

The stabilizers of the invention can be incorporated or blended into poly-α-olefins by any of the conventional methods used for blending such materials into plastics or resins. Typical of such methods that can be suitably employed include milling on heated rolls, deposition from solvents and dry blending.

The β-resorcylic acid derivatives described herein lend to poly-α-olefin compositions improved stability, and more specifically, improved stability against deterioration resulting from exposure to outdoor weathering, sunlight or ultraviolet light. Polyethylene compositions are sometimes protected against outdoor weathering with carbon black pigment or related opaque materials. However, such pigments limit the outdoor use of polyethylene compositions so protected to uses where color and transparency are unimportant. The present β-resorcylic acid derivatives do not impart objectionable coloration to poly-α-olefin compositions and thus poly-α-olefin compositions stabilized therewith can be utilized for a wide diversity of outdoor uses.

Poly-α-olefin compositions stabilized in accordance with the invention can be cast, extruded or molded into sheets, rods, tubes and piping, filaments and other shaped articles. The compositions can also be used for coating paper, cloth, wire, metal foil, glass fiber fabrics, synthetic and natural textiles and other such substances. Poly-(β-resorcylic acid) and poly-(4-acetyl-β-resorcylic acid) have particular utility in thin films or sheets 0.5 to 100 mils in thickness, for example, as these polymeric compounds tend to be more non-migratory in the poly-α-olefin than monomeric stabilizers and thus confer stability to thin films or sheets for relatively long periods of exposure.

The invention is illustrated by the following examples of preferred embodiments thereof.

EXAMPLE 1

Into several portions of polyethylene having an average molecular weight of about 30,000 and a density of 0.945 was hot-roll compounded 1% by weight of the following compounds: 4-acetyl-β-resorcylic acid, 2-acetyl-β-resorcylic acid, diacetyl-β-resorcylic acid, poly-(β-resorcylic acid) having an average molecular weight of 355, and poly-(4-acetyl-β-resorcylic acid) having an average molecular weight of 280. The resulting compositions were thereafter compression-molded into sheets about 1/16 inch thick, ten samples 1½ by ½ inch were diced out of the compression-molded sheets, bent into a U-shape and exposed to outdoor weathering at Kingsport, Tennessee. The stressed portion of each sample was mounted facing south. Ten additional samples containing no stabilizer were prepared and also subjected to the weathering test for comparative purposes. The exposure times in days required to start cracks in half of the samples (5 samples) are recorded below in Table 1.

Table 1

| Additive | Stress-Cracking Resistance. Exposure Time (Days) Required to Start Cracks in Half of the Samples |
| --- | --- |
| None | 342 |
| 4-Acetyl-β-resorcylic acid | 368 |
| 2-Acetyl-β-resorcylic acid | 382 |
| Diacetyl-β-resorcylic acid | >432 |
| Poly-(4-acetyl-β-resorcylic acid) | 368 |
| Poly-(β-resorcylic acid) | 371 |

As can be observed from the data in Table 1, the subject β-resorcylic acid derivatives are effective stabilizers in polyethylene against deterioration resulting from exposure to sunlight, the stress cracking resistance of the polyethylene samples containing the β-resorcylic acid derivatives being increased 26, 40, greater than 90, 26 and 29 days respectively over the polyethylene sample containing no stabilizer. All of the added stabilizers were compatible with the polyethylene sample and did not exude therefrom during the course of the weathering test.

EXAMPLE 2

Into polyethylene having an average molecular weight of about 27,600 and a density of 0.919 was hot-roll-compounded 1% by weight of poly-(4-acetyl-β-resorcylic acid) having an average molecular weight of about 280. The resulting composition was compression molded into a film 5 mils thick and cut into 2½ by ½ inch samples. Similar polyethylene samples containing no additive were also prepared. The thus prepared samples were exposed to artificial weathering in an Atlas Twin-Arc Weather-Ometer described in Analy. Chem., 25, 460 (1953) that was modified by the addition of 10 Westinghouse 20 watt fluorescent sun lamps. The exposed samples were tested for deterioration after 400 hours and after 800 hours of exposure to the artificial weathering by elongation measurements on an Instron Tensile Tester at a rate of stretch of 100% per minute. The samples were conditioned 3 days at 73° C. at a relative humidity of 50% before testing. The results of the test are summarized by the data set out in Table 2 below.

Table 2

| Additive | Percent Elongation Retained After Exposure of— | |
| --- | --- | --- |
|  | 400 hours | 800 hours |
| None | 11 | 0 |
| Poly-(4-acetyl-β-resorcylic acid) | 63 | 26 |

EXAMPLE 3

Into several portions of polyethylene having an average molecular weight of about 30,000 and a density of 0.945 was hot-roll-compounded 1% by weight of diacetyl-β-resorcylic acid and poly-(4-acetyl-β-resorcylic acid) having an average molecular weight of about 280, as well as 1% by weight of p-tertiary butylphenyl salicylate for comparative purposes. The resulting compositions were compression molded into films 5 mils thick and cut into 2½ by ½ inch samples. Similar polyethylene samples containing no additive were also prepared. The thus prepared samples were exposed to artificial weathering in an Atlas Twin-Arc Weather-Ometer described in Anal. Chem. 25, 460(1953) that was modified by the addition of 10 Westinghouse 20 watt fluorescent sun lamps. The exposed samples were tested for deterioration after 410 hours of exposure to the artificial weathering by elongation measurements on an Instron Tensile Tester at a rate of stretch of 2,000% per minute. The samples were conditioned 3 days at 73° C. at a relative humidity of 50% before testing. The results of the test are summarized by the data set out in Table 3 below.

Table 3

| Additive | Percent Elongation Retained After Exposure of 410 Hours |
| --- | --- |
| None | 12 |
| Diacetyl-β-resorcylic acid | 75 |
| Poly-(4-acetyl-β-resorcylic acid) | 75 |
| p-tert. butylphenyl salicylate | 38 |

As can be observed from the data in Table 3, the subject β-resorcyclic acid derivatives are effective ultraviolet inhibitors for thin films of polyethylene.

EXAMPLE 4

Into several portions of polypropylene having a melt index (A.S.T.M. D12 38–52T) of 0.08 and an ash content of 0.43% was extrusion-compounded 1% by weight of poly-(4-acetyl-β-resorcyclic acid) having an average molecular weight of about 280 as well as 1% by weight of 2-mercaptobenzimidazole for comparative purposes. The resulting compositions were extruded into a film 20 mils thick and then cut into 2½ by ½ inch samples. Similar polypropylene samples containing no additive were also prepared. The thus prepared samples were exposed to artificial weathering in an Atlas Twin-Air Weather-Ometer described in Anal. Chem., 25, 460 (1953) that was modified by the addition of 10 Westinghouse 20 watt fluorescent sun lamps. Weathering damage to the exposed samples was assessed as follows and summarized in Table 4:

(a) the flexural strength of the samples was measured after 450 hours of exposure by the Tour-Marshall test for stiffness in flexure (A.S.T.M. D747–43), (b) the percent of initial inherent viscosity of the polypropylene left after 95 hours of exposure as determined in tetralin solutions of 0.25 g. polypropylene per 100 cc. of tetralin at 145° C., the polypropylene having an inherent viscosity of 2.77. Inherent viscosity is defined as $$\frac{\ln \eta r}{0.25}$$

where $\eta r$ is the ratio of viscosity of solution to viscosity of solvent.

*Table 4*

| Additive | Percent Initial Flexural Strength Left After 450 Hours' Exposure | Percent Initial Inherent Viscosity Left After 95 Hours' Exposure |
|---|---|---|
| None | 0 | 23 |
| Poly-(4-acetyl-β-resorcylic acid) | 40 | 94 |
| 2-Mercaptobenzimidazole | 0 | 39 |

The compound, 2-mercaptobenzimidazole, used for comparative purposes was disclosed in U.S. Patent 2,727,879 as an effective light stabilizer for polyethylene.

The polymeric β-resorcyclic acid derivatives of the present invention can be prepared by the methods disclosed in Examples 5 and 6 set out herein below. The polymers of β-resorcyclic acid used in the invention preferably are prepared as compositions having average molecular weights of about 250–500.

EXAMPLE 5

PREPARATION OF POLY-(4-ACETYL-β-RESORCYLIC ACID)

Seventy-five grams of 4-acetyl-β-resorcylic acid were thoroughly ground in a mortar with 1½ grams of zinc chloride. This mixture was placed in a 500 ml. Erlenmyer flask and heated in a metal bath maintained at 130–135° C. The internal temperature of the resulting mixture gradually rose to 118–120° C. during 20 minutes, at which point the mixture began to melt. About 5 minutes were required to melt the mass completely whence acetic acid vapors distilled off. The mixture was heated 15 minutes longer at 120–126° C. Manual stirring was employed throughout the operation. The resulting mixture was then cooled to 50–60° C., dissolved in 190 ml. acetone and the acetone solution filtered into 1500 ml. of vigorously stirred cold water which precipitated the product as an easily filterable powder. The resulting poly-(4-acetyl-β-resorcyclic acid) had an average molecular weight of about 300.

EXAMPLE 6

PREPARATION OF POLY-β-RESORCYLIC ACID

A solution of 10 g. of poly-(4-acetyl-β-resorcyclic acid), as prepared in Example 5, in a mixed solvent of 40 ml. of acetone, 20 ml. of water and 14 ml. of ammonium hydroxide (28%) was allowed to stand at 25–30° C. for 1.5 hours to hydrolyze off the terminal acetyl groups. The resulting poly-(β-resorcyclic acid) was isolated by acidifying the solution with 16 ml. of 35% hydrochloric acid in 64 ml. of water. The resulting precipitated solid was filtered and washed with water to yield 3.5 g. of poly-(β-resorcyclic acid).

Although the invention has been described in considerable detail with reference to certain preferred embodiments thereof it will be understood that variations and modifications can be effected within the spirit and scope of the invention as described hereinabove and as defined in the appended claims.

We claim:

1. A solid poly-α-olefin composition comprising a solid poly-α-olefin prepared from an α-monoolefinic aliphatic hydrocarbon having 2 to 3 carbon atoms containing 0.1% to 10% by weight based on said poly-α-olefin of a β-resorcylic acid derivative selected from the group consisting of 4-acetyl-β-resorcylic acid, 2-acetyl-β-resorcylic acid, diacetyl-β-resorcylic acid, poly-(β-resorcylic acid) and poly-(4-acetyl-β-resorcylic acid), said poly-(β-resorcylic acid) and said poly-(4-acetyl-β-resorcylic acid) having an average molecular weight of about 250 to 500.

2. A solid polyethylene composition comprising solid polyethylene containing 0.1% to 10% by weight based on said polyethylene of a β-resorcylic acid derivatve selected from the group consisting of 4-acetyl-β-resorcylic acid, 2-acetyl-β-resorcylic acid, diacetyl-β-resorcylic acid, poly-(β-resorcylic acid) and poly-(4-acetyl-β-resorcylic acid), said poly-(β-resorcylic acid) and said poly-(4-acetyl-β-resorcylic acid) having an average molecular weight of about 250 to 500.

3. A solid polyethylene composition comprising solid polyethylene containing 0.5% to 5% by weight based on said polyethylene of 4-acetyl-β-resorcylic acid.

4. A solid polyethylene composition comprising solid polyethylene containing 0.5% to 5% by weight based on said polyethylene of 2-acetyl-β-resorcylic acid.

5. A solid polyethylene composition comprising solid polyethylene containing 0.5% to 5% by weight based on said polyethylene of diacetyl-β-resorcylic acid.

6. A solid polyethylene composition comprising solid polyethylene containing 0.5% to 5% by weight based on said polyethylene of poly-(β-resorcylic acid) having an average molecular weight of about 250 to 500.

7. A solid polyethylene composition comprising solid polyethylene containing 0.5% to 5% by weight based on said polyethylene of poly-(4-acetyl-β-resorcylic acid) having an average molecular weight of about 250 to 500.

8. A solid polypropylene composition comprising solid polypropylene containing 0.5% to 5% by weight based on said polypropylene of poly-(4-acetyl-β-resorcylic acid) having an average molecular weight of about 250 to 500.

9. A solid poly-α-olefin composition in a film 0.5 to 100 mils in thickness comprising a solid poly-α-olefin prepared from an α-monoolefinic aliphatic hydrocarbon having 2 to 3 carbon atoms containing 0.5% to 5% by weight based on said poly-α-olefin of poly-(β-resorcylic acid) having an average molecular weight of 250 to 500.

10. A composition as described in claim 9 wherein the poly-α-olefin is polyethylene.

11. A solid poly-α-olefin composition in a film 0.5 to 100 mils in thickness comprising a solid poly-α-olefin prepared from an α-monoolefinic aliphatic hydrocarbon having 2 to 3 carbon atoms containing 0.5% to 5% by weight based on said poly-α-olefin of poly-(4-acetyl-β-resorcylic acid) having an average molecular weight of 250 to 500.

12. A composition as described in claim 11 wherein the poly-α-olefin is polyethylene.

References Cited in the file of this patent

UNITED STATES PATENTS

| | | |
|---|---|---|
| 2,734,000 | Pessel | Feb. 7, 1956 |
| 2,837,490 | Hecker | June 3, 1958 |
| 2,843,577 | Friedlander et al. | July 15, 1958 |